United States Patent [19]
Morita et al.

[11] Patent Number: 5,399,800
[45] Date of Patent: Mar. 21, 1995

[54] ELECTRONIC MUSICAL INSTRUMENT INCLUDING AN APPARATUS FOR AURALLY AND VISUALLY DISPLAYING SPECIFICATION EXPLANATIONS AND STATES OF THE ELECTRONIC MUSICAL INSTRUMENT

[75] Inventors: Shigehiro Morita; Tsutomu Saito, both of Hamamatsu, Japan

[73] Assignee: Kabushiki Kaisha Kawai Gakki Seisakusho, Shizuoka, Japan

[21] Appl. No.: 998,854

[22] Filed: Dec. 30, 1992

[30] Foreign Application Priority Data

Jan. 28, 1992 [JP] Japan .................................. 4-037023
Jan. 28, 1992 [JP] Japan .................................. 4-037024

[51] Int. Cl.$^6$ ...................... G09B 15/04; G10H 1/06; G10H 1/26
[52] U.S. Cl. ...................... 84/609; 84/622; 84/478
[58] Field of Search .................. 84/609–614, 84/638–642, 622–625, 477 R, 478

[56] References Cited

U.S. PATENT DOCUMENTS 4,147,083 4/1979 Woron et al. ............... 84/642 X
4,350,070 9/1982 Bahu ........................... 84/478 X
5,005,459 4/1991 Adachi et al. ............... 84/478 X
5,294,745 3/1994 Yamauchi et al. ........... 84/639 X Primary Examiner—Stanley J. Witkowski

[57] ABSTRACT

An electronic musical instrument, including a tone generator for forming play tones and accompaniment tones according to tone source data read out from a waveform memory based on keyboard operations or auto-accompaniment data stored in a memory. The electronic musical instrument further includes a large number of operation switches on a panel for inputting tone parameters such as rhythm, tone color (type of instrument), tempo, and a display for displaying set tone parameters. Voice and character data representing the functions or specifications of the musical instrument, the operation guidelines of the operation switches, or the current setting state of the musical instrument, are stored in a memory. When a user performs a specific operation and requires assistance, voice data and character data are supplied to the tone generator and the display, and the user can visually and aurally recognize the functions or operation guidelines of the musical instrument.

10 Claims, 19 Drawing Sheets

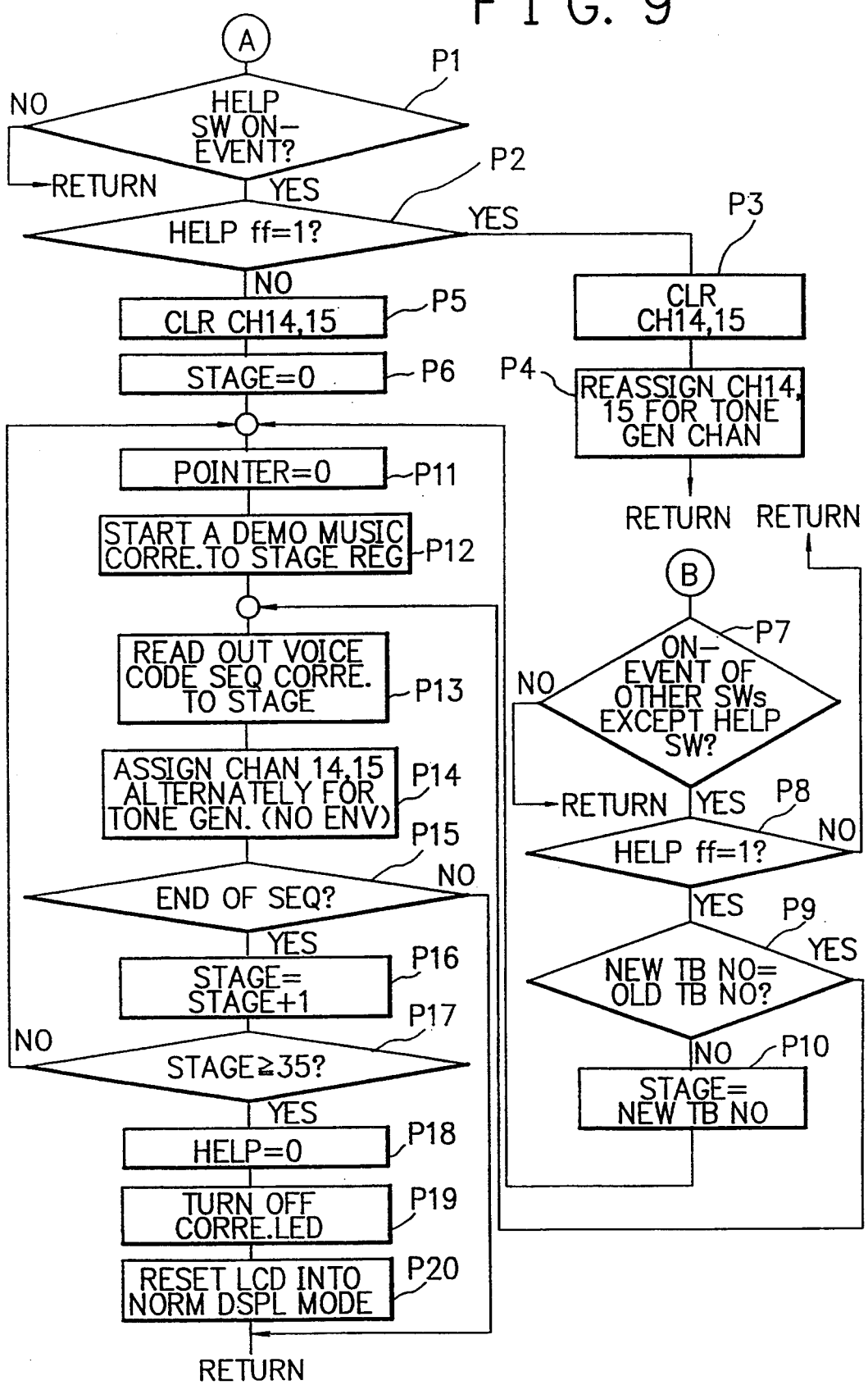

FIG. 10(a)
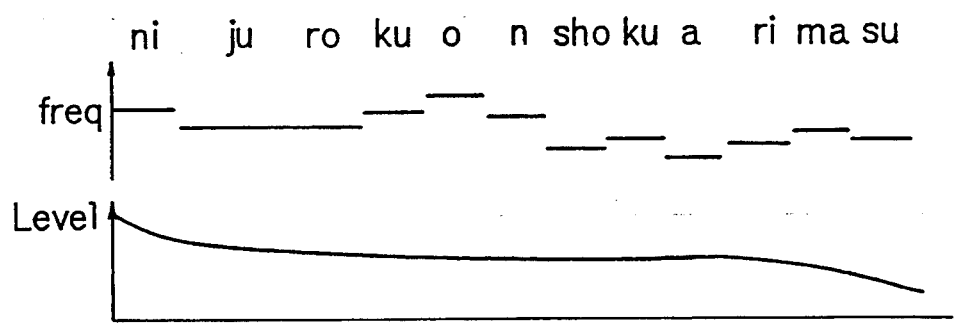
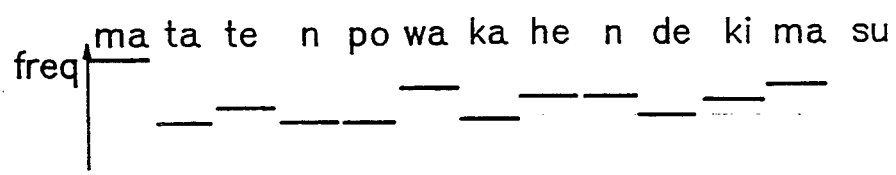
FIG. 10(b)
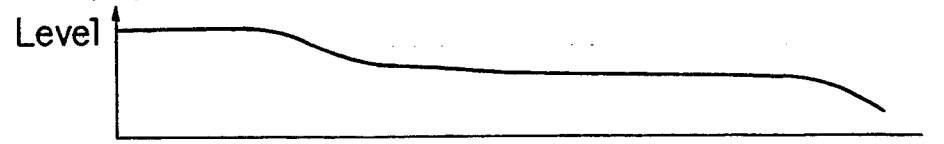
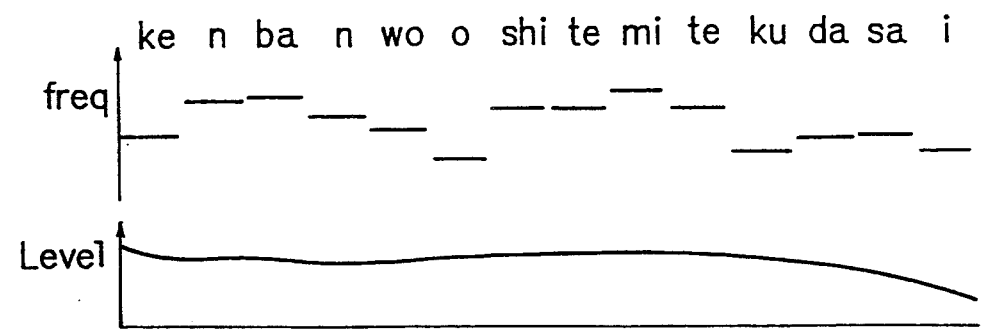
FIG. 10(c)

FIG. 14(a)

SWING

| SWING | 1. | 4. |
|---|---|---|
| RHYTHM | [2] | 5. |
| | 3. | 6. |

| L/H | 1. LIGHT2 | 4. HEAVEY1 |
|---|---|---|
| LIGHT/ | 2. LIGHT1 | 5. HEAVEY2 |
| HEAVY | [3] MIDDLE | |

FIG. 14(c)

T. DIAL

| T.DIAL | 40 ~ [130] ~ 240 |
|---|---|
| TEMPO DIAL | DIAL DOWN  NOW  DIAL UP |

FIG. 14(d)

KEY-205

| KEY | MIDI KEY NOM=49 |
|---|---|
| | VELO CITY=87 |
| | PRESSER=40 |

FIG. 15

| TONE CLR NO | TONE CLR NAME |
|---|---|
| 0 | PIANO1 |
| 1 | PIANO2 |
| 2 | HARPSHI |
| 3 | ORGAN |
| 4 | |
| 5 ⋮ | ⋮ |
| N | HI HAT |
| NT1 | TOMTOM |
| NT2 | SIMBAL |
| ⋮ | ⋮ |
| M | a |
| M+1 | i |
| M+2 | u |

FIG. 17

| OPN SW NO. | SW NAME | REG | DSPL FLAG |
|---|---|---|---|
| 0 | POWER | — | — |
| 1 | HELP | — | 1 |
| 2 | MIKE | 4 | 0 |
| 3 | T.VOL1 | | 0 |
| | T.VOL2 | | 0 |
| | T.VOL3 | | 0 |
| | T.VOL4 | 5 | 0 |
| | T.VOL5 | | 1 |
| | T.VOL6 | | 0 |
| | T.VOL7 | | 0 |
| | R.VOL1 | | 0 |
| | R.VOL2 | | 0 |
| | R.VOL3 | | 1 |
| | R.VOL4 | 3 | 0 |
| | R.VOL5 | | 0 |
| | R.VOL6 | | 0 |
| | R.VOL7 | | 0 |
| | SUS | 2 | 0 |
| | TOUCH | 3 | 1 |
| | PIANO | 1 | 1 |
| | VIOLIN | 4 | 0 |
| | FLUTE | 3 | 0 |
| | TRUMPET | 1 | 0 |
| | DRUM | 1 | 0 |
| | VOICE | 2 | 0 |
| | L/H | 3 | 0 |
| | SWING | 2 | 1 |
| | MARTCH | 1 | 0 |
| | ROCK | 3 | 0 |
| | BALLAD | 3 | 0 |
| | WALTS | 1 | 0 |
| 31 | MATSURI | 2 | 0 |

| | | | |
|---|---|---|---|
| 32 | START | | |
| 33 | DIAL UP DOWN | 130 | 0 / 0 |

| | | Velocity | ON/OFF |
|---|---|---|---|
| 34 | KEY 1 | — | |
| | KEY 2 | — | |
| | KEY 3 | — | |
| | KEY 4 | — | |
| | ⋮ | ⋮ | |
| | KEY 61 | — | |

KCC: KANJI CHARACTER CONVERSION

ELECTRONIC MUSICAL INSTRUMENT INCLUDING AN APPARATUS FOR AURALLY AND VISUALLY DISPLAYING SPECIFICATION EXPLANATIONS AND STATES OF THE ELECTRONIC MUSICAL INSTRUMENT

BACKGROUND OF THE INVENTION

Field of the Invention

The present invention relates to an explanation apparatus for an electronic musical instrument and, more particularly, to an explanation apparatus used for giving an explanation of the specifications and the current state of the electronic musical instrument, and suitably used for giving an explanation of the specifications or the current state of the electronic musical instrument with a voice by utilizing a tone generator of the electronic musical instrument.

Description of the Related Art

As is well known, an electronic musical instrument such as an electronic piano, an electronic keyboard, a synthesizer, or the like has a function of performing a play operation upon key operations on a keyboard, and a function of performing an auto-play operation on the basis of auto-play data.

A large number of operation switches for designating tone color, rhythm, and the like are arranged on an operation panel. When a user operates these operation switches, he or she can designate tone color of a tone to be generated.

As described above, recent electronic musical instruments have very complicated specifications, and it takes a long time to learn how to use these instruments. The same applies to a case wherein a sales person gives an explanation of an electronic musical instrument. It is hard for such a sales person to understand the specifications of the commodities.

A person who purchases an electronic musical instrument must spend much a long time learning the specifications of the electronic musical instrument with a text book such as a user's manual. However, as described above, since recent electronic musical instruments have very complicated specifications, a person who purchases one often has "functions that he or she never use from the date of purchase". This may prove how complicated the functions of an electronic musical instrument are or how hard it is for a person to learn the specifications of an electronic musical instrument using a text book.

In order to facilitate understanding of an electronic musical instrument having such complicated specifications, a text book is written in easy words for a user, but it is hard for ordinary persons to read a book. In addition, as the specifications of electronic musical instruments become more complicated, the number of pages of the text book is increased. Therefore, it is troublesome for a user to locate a particular paragraph which he or she wants to learn from the text book.

SUMMARY OF THE INVENTION

The present invention has as its object to provide an explanation apparatus for an electronic musical instrument, which can give an explanation of the specifications of the electronic musical instrument that can be easily understood, and facilitate understanding.

According to one aspect of the present invention, an explanation apparatus for an electronic musical instrument comprises first display means capable of displaying a plurality of types of information on a common display device, character code information storage means for storing a plurality of pieces of character code information associated with explanations of specifications and states of the electronic musical instrument in a sequence, tone generation means for generating a plurality of tones, play information storage means for storing play information such as a demonstration music piece in a sequence, operation means for enabling a specification/state explanation function, second display means for reading out the character code information from the character code information storage means in response to an operation of the operation means, and causing the display device to perform a corresponding display, and tone control means for reading out the play information from the play information storage means in response to an operation of the operation means, and operating the tone generation means to generate tones.

Since the explanations of the specifications or the current state of the electronic musical instrument are given by means of characters by utilizing a display unit provided with the electronic musical instrument, a user can understand the specification or the current state of the electronic musical instrument while observing the display unit, and can operate the electronic musical instrument according to the display content. Thus, when a user views the specifications of the electronic musical instrument, he or she can easily understand them, can shorten the time required for understanding the specifications of the electronic musical instrument, and can easily recognize the current state of the musical instrument.

According to another aspect of the present invention, an explanation apparatus for an electronic musical instrument comprises tone generation means for generating a plurality of tones and a voice, tone color designation means for designating a tone color of the tone, tone color data storage means for storing tone color data associated with the tone color, key information designation means for designating key information to be subjected to tone generation, tone control means for assigning the designated key information to a certain channel of the tone generation means and causing the tone generation means to generate a tone on the basis of the tone color data of the designated tone color, operation means for enabling a specification/state explanation function, voice code storage means for storing voice code information associated with the explanation in a sequence, voice data storage means for storing voice data corresponding to the voice code information, and voice control means for reading the voice data on the basis of the voice code information read from the voice code storage means in response to an operation of the operation means, assigning the readout voice data to a certain channel of the tone generation means, and causing the tone generation means to generate the voice.

Since the explanation of the specifications and state of the electronic musical instrument are provided using a voice by utilizing the tone generation means inherent to the electronic musical instrument, a user can aurally obtain information associated with the explanation of the specifications or the state of the electronic musical instrument, and can easily learn and understand the specifications of the electronic musical instrument. Thus, the time required for understanding the specifications of the electronic musical instrument is shortened, and a user can easily recognize the current state of the musical instrument.

Further scope of applicability of the present invention will become apparent from the detailed description given hereinafter. However, it should be understood that the detailed description and specific examples, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a flow chart showing the details of a HELP processing operation;

FIGS. 10(a) to 10(c) are graphs showing the relationship between the voice generation frequency and the tone volume level of Japanese words;

FIGS. 14(a) to 14(d) are views showing examples of contents displayed on the display device;

FIG. 15 is a table showing the correspondence between the tone color No. and the tone color name;

FIG. 17 is a map showing the relationship among the operation switch No., the switch name, the register value, and the display flag;

DETAILED DESCRIPTION OF THE PREFERRED EMBODIMENTS

Figure 1:
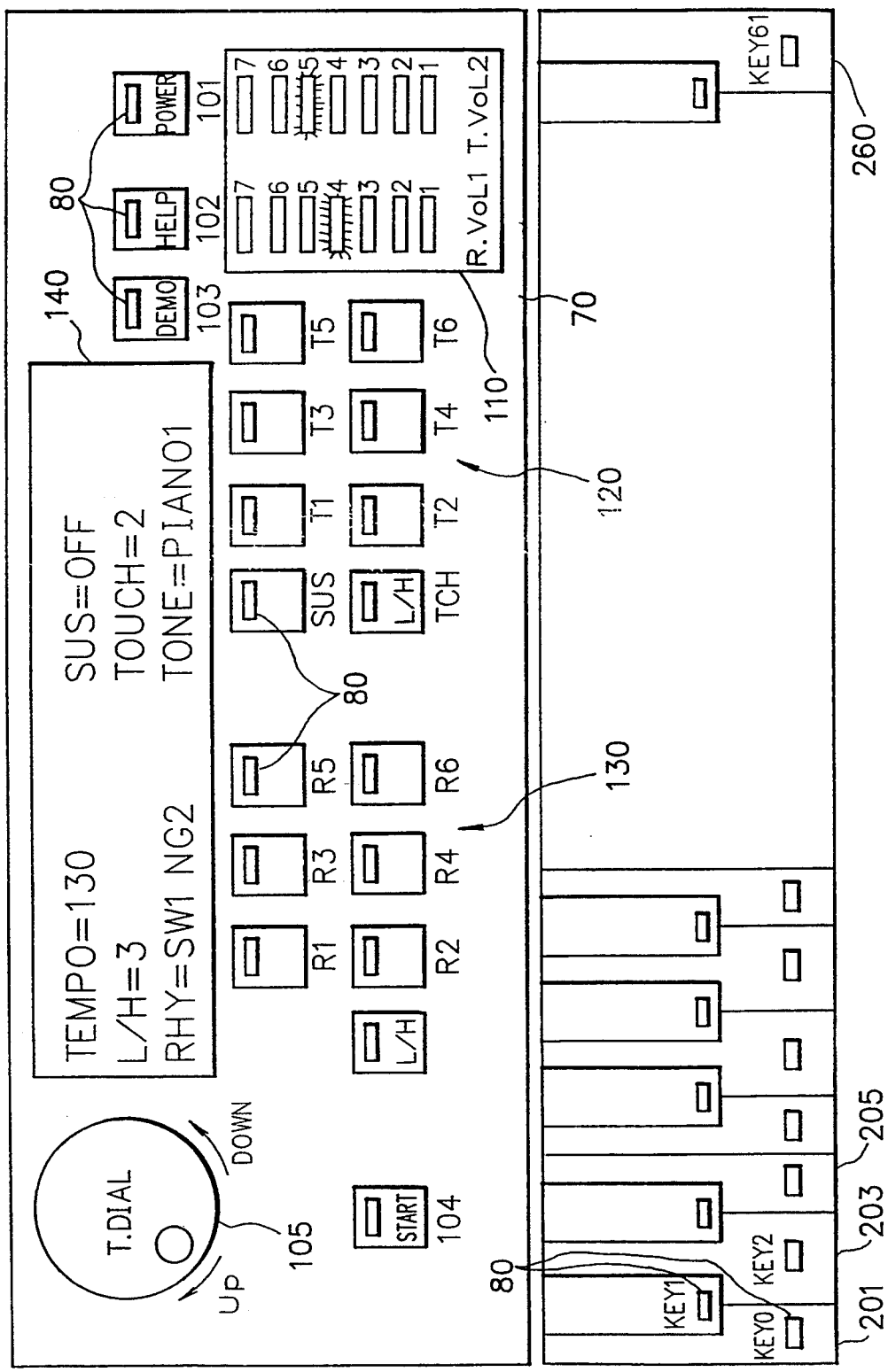
FIG. 1 is a plan view showing the outer appearance of an electronic musical instrument according to the present invention.

FIG. 1 is a plan view showing the outer appearance of an electronic musical instrument of the present invention. A panel 70 of this electronic musical instrument has a large number of operation or panel switches (combinations of switches and LEDs 80 indicating the states of the corresponding switches), and an LCD (liquid crystal display) 140. A keyboard includes 61 keys 201 to 260, and each key has a switch and a display element (LED) indicating the state of the corresponding switch.

The operation switches of the panel 70 include a power supply switch 101, a HELP switch 102, a DEMONSTRATION switch 103, tone volume control switches 110, tone color/effect selection switches 120, rhythm selection switches 130, a rhythm start switch 104, and a dial 105.

The LCD 140 has a display function of, e.g., 64×256 dots, and displays tempo information, rhythm L/H (light/heavy) information, rhythm selection information RHY, sustain information SUS, touch control information TOUCH, tone color selection information TONE, and the like as follows:

TABLE 1

- Character Code Information 0 -

| TEMPO = 130 | SUSTAIN = OFF |
|---|---|
| L/H = 3 | TOUCH = 2 |
| RHY = SWING2 | TONE = PIANO1 |

These displayed values are updated when the corresponding operation switches on the panel are operated or they are changed to new values based on MIDI (Musical Instrument Digital Interface) inputs.

In addition, the values corresponding to the operation switches on the panel can be controlled by sequence data stored in a sequencer. However, since such control belongs to the same category as that based on the MIDI inputs, a detailed description thereof will be omitted. The LCD 140 is used for giving explanations of the specifications or state of the electronic musical instrument upon operation of the HELP switch 102.

The power supply switch 101 is arranged for supplying a driving electric power to the respective units of the electronic musical instrument. When the power supply switch 101 is turned on, the functions of the electronic musical instrument are ready to operate.

The HELP switch 102 is used when a demonstration play is performed or an explanation of the specifications or the state is given.

More specifically, when only the HELP switch 102 is operated after the power supply switch is turned on, the demonstration play is performed, and the outline of, e.g., the functions of the electronic musical instrument is explained. However, when another operation switch is operated during this interval, the function of the operated operation switch is explained using the display devices (LCD and LED) and a voice while the demonstration play is continued. The demonstration switch DEMO 103 is a switch for instructing the demonstration play as in a conventional apparatus.

The tone volume control switches 110 include a switch T.VOL2 for controlling the tone volume of a tone color, and a switch R.VOL1 for controlling the tone volume of a rhythm. Each of these tone volume control switches is constituted by 7-contact multi-step switches.

The tone color/effect selection switches 120 include six tone color group switches T1 to T6, a switch SUS for selecting a sustain effect level, and a touch switch TCH for selecting a touch effect level.

The tone color group switches T1 to T6 are alternative switches, and are used for selecting one of tone color groups. The tone color group switches T1 to T6 include a switch T1 (keyboard instrument group); T2 (stringed instrument group); T3 (woodwind instrument group); T4 (brass instrument group); T5 (percussion group); and T6 (human voice group).

For example, the first tone color group switch T1 is indicated with "PIANO" on its tablet surface. Every time the first tone color group switch T1 is operated, a new tone color can be selected in turn as follows:

| 1. PIANO1 | 2. PIANO2 | 3. E.PIANO |
|---|---|---|
| 4. HARPSHI. | 5. ORGAN | 6. ACCORDION |

In this case, the selected tone color name is displayed on the LCD 140. When the first tone color group switch T1 is further depressed while the last tone color "ACCORDION" is selected, the first tone color "PIANO1" is selected in turn.

The rhythm selection switches 130 include six rhythm group switches R1 to R6, and a switch L/H for selecting the weight of a rhythm. The rhythm group switches R1 to R6 are alternative switches, and are used for selecting one of rhythm groups. The rhythm group switches R1 to R6 include a switch R1 (SWING); R2 (MARCH); R3 (ROCK); R4 (BALLAD); R5 (WALTZ); and R6 (MATSURZ).

For example, the first rhythm group switch R1 is indicated with "SWING" on its tablet surface, and every time the first rhythm group switch R1 is depressed, a new rhythm pattern can be selected in turn as follows:

| 1. SWING1 | 2. SWING2 | 3. SWING3 |
|---|---|---|
| 4. SWING4 | 5. SWING5 | 6. SWING6 |

The selected rhythm name is displayed on the LCD 140.

These rhythm patterns allow selection of various patterns based on, e.g., the same "swing" rhythm. When the first rhythm group switch R1 is depressed while the last rhythm pattern "SWING6" is selected, the first rhythm pattern "SWING1" is selected in turn.

The start switch 104 is a switch for controlling to start/stop an auto-rhythm mode. The tempo setting dial T.DIAL 105 is constituted by two switches (UP switch/DOWN switch) for setting a tempo speed. When the dial 105 is rotated clockwise, the UP switch is enabled; when it is rotated counterclockwise, the DOWN switch is enabled. The key switches include 61 switches, i.e., KEY0 to KEY60, and have corresponding display elements 80 (LEDs).

Figure 2:
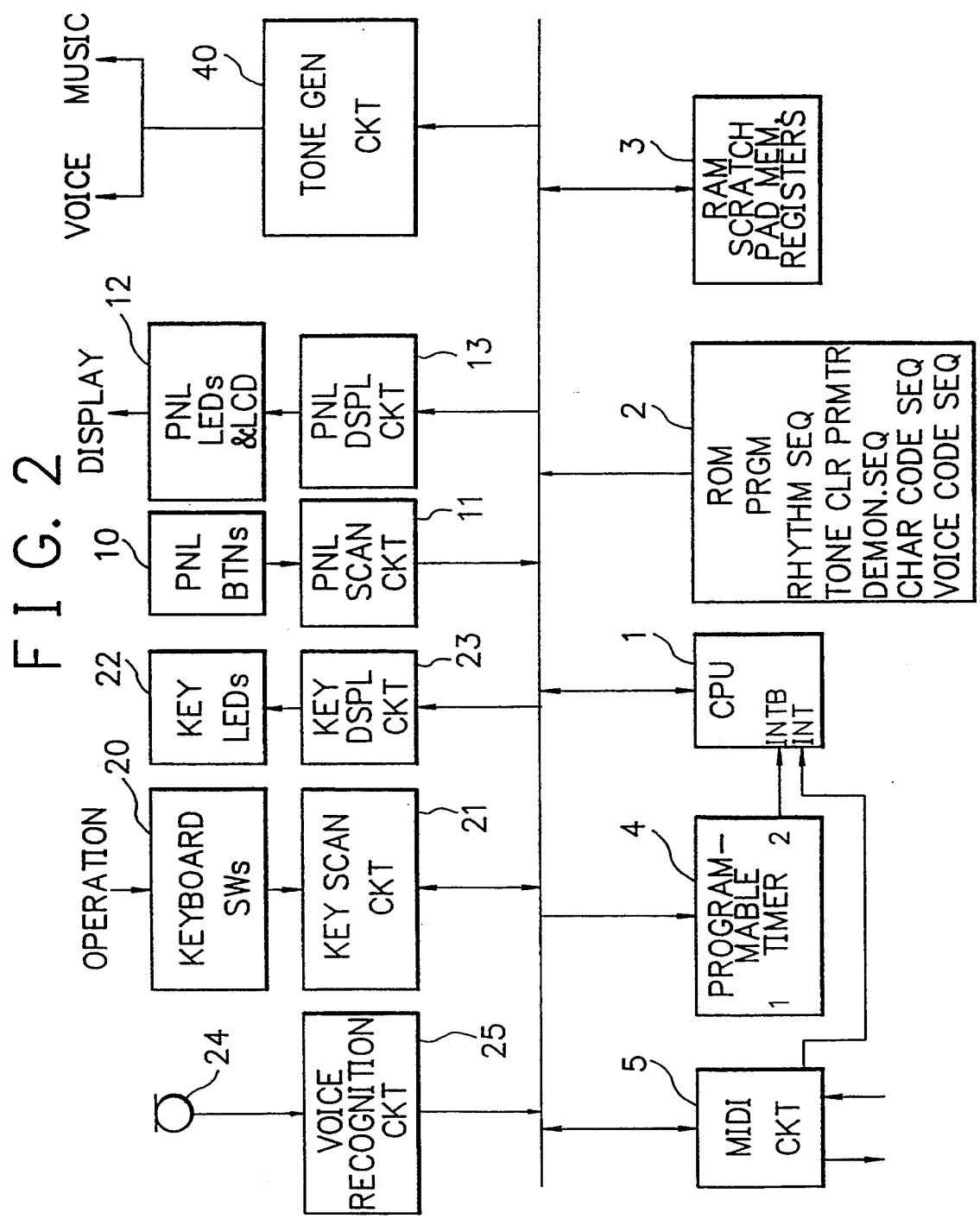
FIG. 2 is a block diagram showing an explanation apparatus according to an embodiment of the present invention.

FIG. 2 is a block diagram showing an embodiment of the explanation apparatus for the electronic musical instrument according to the present invention. In FIG. 2, reference numeral 1 denotes a CPU; 2, a ROM; 3, a RAM; 4, a programmable timer; and 5, a MIDI circuit. Reference numeral 10 denotes panel buttons; 11, a panel scan circuit; 12, a display device including the LEDs and the LCD; and 13, a panel display circuit. Furthermore, reference numeral 20 denotes keyboard switches; 21, a key scan circuit; 22, key LEDs; 23, a key display circuit; and 40, a tone generation circuit.

The CPU 1 systematically controls this electronic musical instrument. The CPU 1 causes the LCD 140 to display various kinds of information received from the panel and the keyboard, and controls generation of tones corresponding to key information. The CPU 1 also performs sequence control of explanations of the specifications and the state of the musical instrument using a voice.

The ROM 2 stores a program for operating the CPU 1, 48 different rhythm sequence data (auto-play data), parameter data associated with tone colors, demonstration music piece data, character code sequence data, voice code sequence data, and the like.

The RAM 3 is used as a scratch pad memory used in an operation of the CPU 1, and registers for storing the current panel state.

The programmable timer 4 outputs period information set on the basis of preset data designated by the CPU 1. The output period information is used for setting the tempo of an auto-play.

The MIDI circuit 5 converts externally input serial key information, tablet information, and the like into parallel signals, and provides them to the CPU 1 using an interrupt signal. The MIDI circuit 5 converts key information, tablet information, and the like received from the CPU 1 into serial information, and outputs the serial information to an external circuit. Therefore, all the pieces of information to be input from the panel buttons 10 and the keyboard switches 20 can be input by MIDI input signals.

The panel buttons 10 include the power supply switch 101, the HELP switch 102, the DEMONSTRATION switch 103, the tone volume control switches 110, the tone color/effect selection switches 120, the rhythm selection switches 130, the rhythm start switch 104, the tempo setting dial T.DIAL 105, and the like, as described above.

The panel scan circuit 11 scans the operation switches on the panel to detect a change based on an operation of a player.

The panel display circuit 13 is a circuit for driving the LEDs 80 and the LCD 140 on the panel 70 on the basis of information for displaying the current state of the panel 70. The panel display device 12 includes the LEDs 80 and the LCD 140 on the panel 70.

As the keyboard switches 20, two switches are prepared per key so as to detect initial touch information. In addition, conductive rubber is used under the keyboard so as to detect after touch (depression pressure) information.

This electronic musical instrument has a function with which an operator inputs operation information of an operation switch with his or her voice. The voice of an operator is input from a microphone 24 to a voice recognition circuit 25 to recognize the content of the voice. The recognized content of the voice input is fetched as operation information.

The key scan circuit 21 scans the keyboard switches 20 to detect ON/OFF-event information, and detects depression pressure information obtained from the conductive rubber.

The tone generation circuit 40 has a plurality of tone generation channels, receives key information (ON/OFF bit, key code, initial touch, and after touch), tone color information (tone color code), tone volume information (loudness), and panning data (orientation information of each tone), and generates tone information and voice information.

Figure 3:
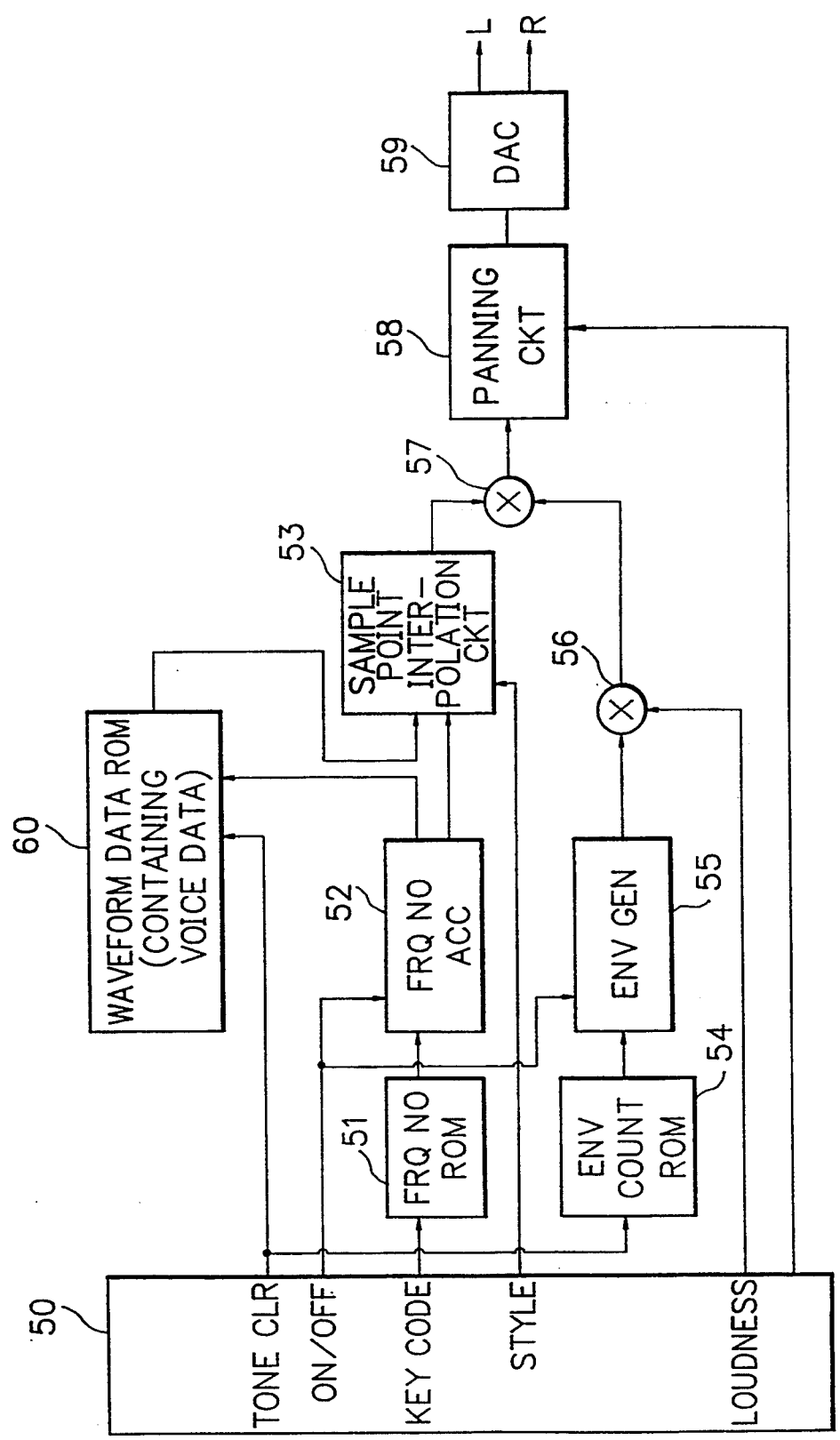
FIG. 3 is a block diagram showing an arrangement of a tone generation circuit used in the present invention.

FIG. 3 shows the arrangement of the tone generation circuit 40 in the block diagram shown in FIG. 2.

In FIG. 3, reference numeral 50 denotes an INT. RAM; 51, a frequency number ROM; 52, a frequency number accumulator; 53, a sample point interpolation circuit; 54, an envelop count ROM; 55, an envelope generator; 56 and 57, multipliers; 58, a panning circuit; and 59, a digital/analog converter (DAC).

The characteristic feature of the tone generation circuit 40 of this embodiment with the above arrangement is that two channels of 16 tone generation channels, which are subjected to time-divisional processing, are utilized for voice generation by utilizing the fact that the present invention is applied to the electronic musical instrument. For this purpose, tone information and voice information are calculated at the same calculation period. In this embodiment, when the HELP switch 102 is not operated, all the 16 tone generation channels are used for tone generation.

The INT. RAM 50 stores key information, tone color information, tone volume information, panning data, and the like for 16 channels received from the CPU 1, and outputs corresponding information to calculation channels in correspondence with 16 time-divisional timings of the tone generation circuit.

The tone color information includes 128 different tone color data as a combination of instrument tone colors such as "PIANO", "FLUTE", and the like, and drum tone colors such as "HIGHHAT", "CYMBAL", and the like, and 128 different voice data such as "a", "i", "u", "e", "o", "ka", "ki", ..., "n", "ga", ..., "pa", ..., "cha", "ryu", and the like (see FIG. 15).

The voice information can be easily generated in correspondence with a foreign language. In this case, it is important that voice data is divided not in units of words but into minimum voice generation units, and a word is constituted by combining voice waveform samples.

For example, when a word "Onryou" (a Japanese word corresponding to "volume") is to be generated, it is stored in units of tones like "o", "n", "ryo", and "u". These tones are read out in turn to generate the word "Onryou".

When a word to be stored is an English word, for example, a word pronounced as "tones", it is stored while being divided into "toh", "on", and "z", and these data are read out in turn.

Such voice generation is convenient for homonyms, and the like. That is, various homonyms can be easily generated by only changing the read frequency of some tones constituting a word (by controlling accent information). FIGS. 10(a) to 10(c) and FIG. 11 are graphs showing the relationship between the frequency and the tone volume level of Japanese and English words.

When the read frequency is modulated too much, the formant is moved, and generated data is hard to be heard as a voice. For this reason, the frequency is preferably controlled to be increased/decreased by about half an octave.

A key code used in key information includes the following 12 bits. Note that cent information CENT is information for setting a fine frequency obtained by equally dividing a halftone into 12 frequencies. For example, in the case of KEY0 for generating a tone at about 65 Hz, octave information OCT=2, note information NOTE=0, and cent information CENT=0.

| OCTAVE | O3 | O2 | O1 | O0 |
|---|---|---|---|---|
| NOTE | N3 | N2 | N1 | N0 |
| CENT | C3 | C2 | C1 | C0 |

In contrast to the key code used in the key information, a key code used in voice information is as follows:

| OCTAVE | — | — | — | — |
|---|---|---|---|---|
| NOTE | N3 | N2 | N1 | N0 |
| CENT | C3 | C2 | — | — |

More specifically, in the key code used in the voice information, only NOTE bits and upper 2 bits of CENT bits can be designated, and other bits indicated by "—" are preset to have appropriate values as a pitch at which a voice is generated. In this manner, the storage capacity of voice code information can be decreased.

Of course, the CPU 1 can select the preset values in consideration of versatility. For example, since male and female voices have different formants, the preset values can be changed in consideration of such a case. A voice generation speed can be set to be higher than a normal speed by increasing a key code used in the voice information.

The frequency number ROM 51 reads out frequency information (frequency number) corresponding to a key code supplied from the INT. RAM 50.

The frequency number accumulator 52 repetitively adds frequency information read out from the frequency number ROM 51, and outputs the sum as a read address of a waveform data ROM 60.

The waveform data ROM 60 includes not only tone waveform data but also voice waveform data, and waveform data is read out from the ROM 60 using upper bits of the output from the frequency number accumulator 52 and tone color number data as an address. The waveform data ROM 60 stores voice data by an ADPCM scheme under a condition that a ROM address is not skipped in a read mode, and stores tone data by a PCM scheme since the tone data is often read out by skipping a ROM address.

The sample point interpolation circuit 53 is a circuit for performing sample-point interpolation of waveform data read out from the waveform data ROM 60 using lower bits of the output from the frequency number accumulator 52. As described above, voice data is stored by the ADPCM scheme since a ROM address is not skipped in the read mode, and tone data is stored by the PCM method since the tone data is often read out by skipping a ROM address. For this reason, the sample point interpolation circuit 53 time-divisionally receives a waveform storage scheme signal (STYLE) indicating whether waveform data read out from the waveform data ROM 60 is ADPCM or PCM data from the INT. RAM 50 in correspondence with 16 channels, and performs an interpolation calculation corresponding to the channel.

More specifically, when stored waveform data is ADPCM scheme data (STYLE=0), a multiplier, an adder, and waveform registers for 16 channels are provided in the sample point interpolation circuit 53. That is, differential waveform data input from the waveform data ROM 60 is multiplied with a decimal address from the frequency number accumulator 52, and the product is added to the content of the corresponding waveform register. The sum is output, and is stored in the corresponding waveform register.

When stored waveform data is PCM scheme data (STYLE=1), a difference detector, a multiplier, and an adder are provided in the sample point interpolation circuit 53. That is, a difference between two waveform data (N) and (N+1) input from the waveform data ROM 60 is calculated, and the difference is multiplied with a decimal address from the frequency number accumulator 52. The product is added to the waveform data (N), and the sum is output.

Of course, a voice waveform may be stored by the PCM scheme in correspondence with the scheme of a tone waveform, and the sample point interpolation circuit 53 for only the PCM scheme can generate both voice and tone data.

The envelope count ROM 54 stores coefficient data for forming an envelope waveform, and a coefficient for forming an envelope waveform is read out from the ROM 54 using a tone color number from INT. RAM 50 as an address. The envelope coefficient to be read out in this manner includes, e.g., envelope speed data, envelope level data, and the like.

The envelope generator 55 time-divisionally receives envelope coefficients corresponding to 16 calculation channels, and generates an envelope waveform.

The multiplier 56 multiplies envelope values for 16 channels with each loudness data. When both envelope value and loudness data are obtained in the floating-point format, the multiplier can be realized by an adder.

The multiplier 57 is a circuit for multiplying each envelope value multiplied with the loudness data and waveform data subjected to sample-point interpolation. When the two input data are obtained in the floating-point format, the multiplier 57 can be realized by an adder.

The panning circuit 58 receives panning data for 16 channels from the INT. RAM 50, and determines the orientation of a tone of the corresponding calculation channel between L/R positions. The panning circuit 58 time-divisionally receives data for 16 channels, and outputs data converted to have output timings for a two-channel (L/R) D/A converter.

The DAC 59 comprises a two-channel (L/R) time-divisional 20-bit serial input D/A converter, and outputs two, i.e., L and R sampled/held analog signals.

The function of the HELP switch 102 will be described below. The HELP switch 102 is operated to use both the conventional demonstration play function and a new specification explanation function. When the HELP switch 102 is operated, and a HELP lamp (80) is turned on, the CPU 1 performs a demonstration play of one music piece as in the conventional apparatus. During the demonstration play, the name of this electronic musical instrument and basic functions (the content shown in, e.g., FIG. 12) are displayed on the LCD 140 of the panel 70.

Upon completion of the demonstration play of one music piece, the CPU 1 reads out a voice code sequence 1 for explaining the outline of this electronic musical instrument from a voice code sequence storage area (2). The voice code sequence 1 stores the following voice code information 1, and information for controlling the read timing of the corresponding character code information 1 from a character code storage area (2), the ON/OFF timing of the display position portions of characters corresponding to the readout character codes, and the like.

In this case, for the purpose of explaining the outline of the electronic musical instrument, the character code sequence may include character code information and information indicating the read timing of, e.g., the corresponding voice code from a voice code storage area.

Based on the voice code information 1, for example, the following information is output. More specifically, "SYSTEM1 will be explained. This SYSTEM1 can control 48 tone colors/48 rhythm patterns using panel operation switch inputs, voice inputs, or MIDI inputs. A maximum of 16 polyphonic tones are available. As for tone generation, the SYSTEM1 is programmed to preferentially generate a tone corresponding to a key operated later."

Meanwhile, based on the character code information 1, for example, the following information is displayed.

TABLE 2

| SYSTEM1 VER2.0 | |
|---|---|
| 48 TONES | 48 RHYTHMS |
| 16 POLYPHONIC | VOICE CONTROL |

Upon completion of the explanation of the outline of the electronic musical instrument, the CPU 1 then gives explanations of operation switches. The explanations are given in the order from the upper right switch toward the lower left switch on the panel, and the keyboard switches are explained finally.

For example, when the switch T.VOL for controlling the tone volume of a tone color is to be explained, a voice code sequence 2 corresponding to T.VOL is read out from the voice code sequence storage area. The voice code sequence 2 stores the following voice code information 2, and information for controlling the read timing of the corresponding character code information 2 from the character code storage area, the ON/OFF timing of the display position portions of characters corresponding to the readout character codes, and the like.

More specifically, the voice code information 2 includes control information for obtaining the following voice output. For example, "the function of T.VOL will be explained. T.VOL means a tone volume, and is used for controlling the tone level of a tone color of a tone which is being currently generated. The tone volume is controlled by seven switches, and can designate 13 steps such as 1/1, 5/2/2, 5/. . . /6, and 5/7. In this case, when the lowermost switch 1 is operated, the smallest tone volume is selected (the LED of the switch 1 flickers). When the uppermost switch 7 is operated, the largest tone volume is selected (the LED of the switch 7 flickers).

When two successive switches are depressed at the same time, an intermediate tone volume therebetween can be obtained. For example, when the switches 1 and 2 are depressed at the same time, a tone volume of 1.5 is set, and both LEDs 1 and 2 are turned on (both LEDs of the switches 1 and 2 flicker). The current tone volume is like this (the LED of the switch 5 flickers)."

The character code information 2 includes control information for obtaining the following display:

TABLE 3

| [T. VOLUME] | 7 | 6 | 5 | 4 | 3 | 2 | 1 |
|---|---|---|---|---|---|---|---|
| TONE VOLUME | HIGH | | | | | | LOW |

In this case, since the frames and numerals of the seven switches displayed on the LCD 140 are not defined by character codes, such display patterns are registered as specific character codes, so that they can be processed in the same manner as other character codes.

Then, the functions of other tone color switches, the effect switches, the rhythm selection switches, the rhythm effect selection switches, the T.DIAL, and the like are explained, and finally, the function of the key switches is explained.

In the case of the explanation of the function of the key switches, a voice code sequence N corresponding to the key switches is read out from the voice code sequence storage area (2). The voice code sequence N stores the following voice code information N, and information for controlling the read timing of the corresponding character code information N from the character code storage area, the ON/OFF timing of the display position portions of characters corresponding to the readout character codes, and the like.

Voice code information N

"The keyboard includes 61 keys. This keyboard has a tone generation frequency range between about 65 Hz and about 2,000 Hz. Of course, if MIDI inputs are used, tones can be generated at frequencies above or below this range. Depress the lowermost C (the LED of KEY0 flickers). The MIDI key number of this key is 36. Try any other key."

Upon completion of this voice code information, the control waits for a key depression by a player.

At this time, the CPU 1 checks whether or not the player depresses a key on the keyboard. If the player depresses no key on the keyboard for five seconds, the CPU 1 performs a demonstration music piece 2, and control returns to the beginning of the program executed upon depression of the HELP switch 102.

When the player depresses a proper key within five seconds, the CPU i displays information associated with the depressed key on the LCD 140. For example, when the player depresses the key of C octave above the key of the lowermost C at a proper strength, the following display is made:

TABLE 4

- Character Code Information N -

| [KEY] | MIDI KEYNO | = 48 |
|---|---|---|
|  | VELOCITY | = 87 |
| KEY12 | PRESSURE | = 0 |

Subsequently, when the key is depressed with a high strength, the value in the item of "PRESSURE" changes in real time. The control can be resumed from the specification/state explanation mode to the normal play mode by depressing the HELP switch 102 again.

After the HELP switch 102 is depressed, if any switch is depressed (or voice-input), the HELP function immediately stops the content explained at that time, and starts an explanation of the function/state of the newly depressed (or voice-input) operation switch.

Figure 12:
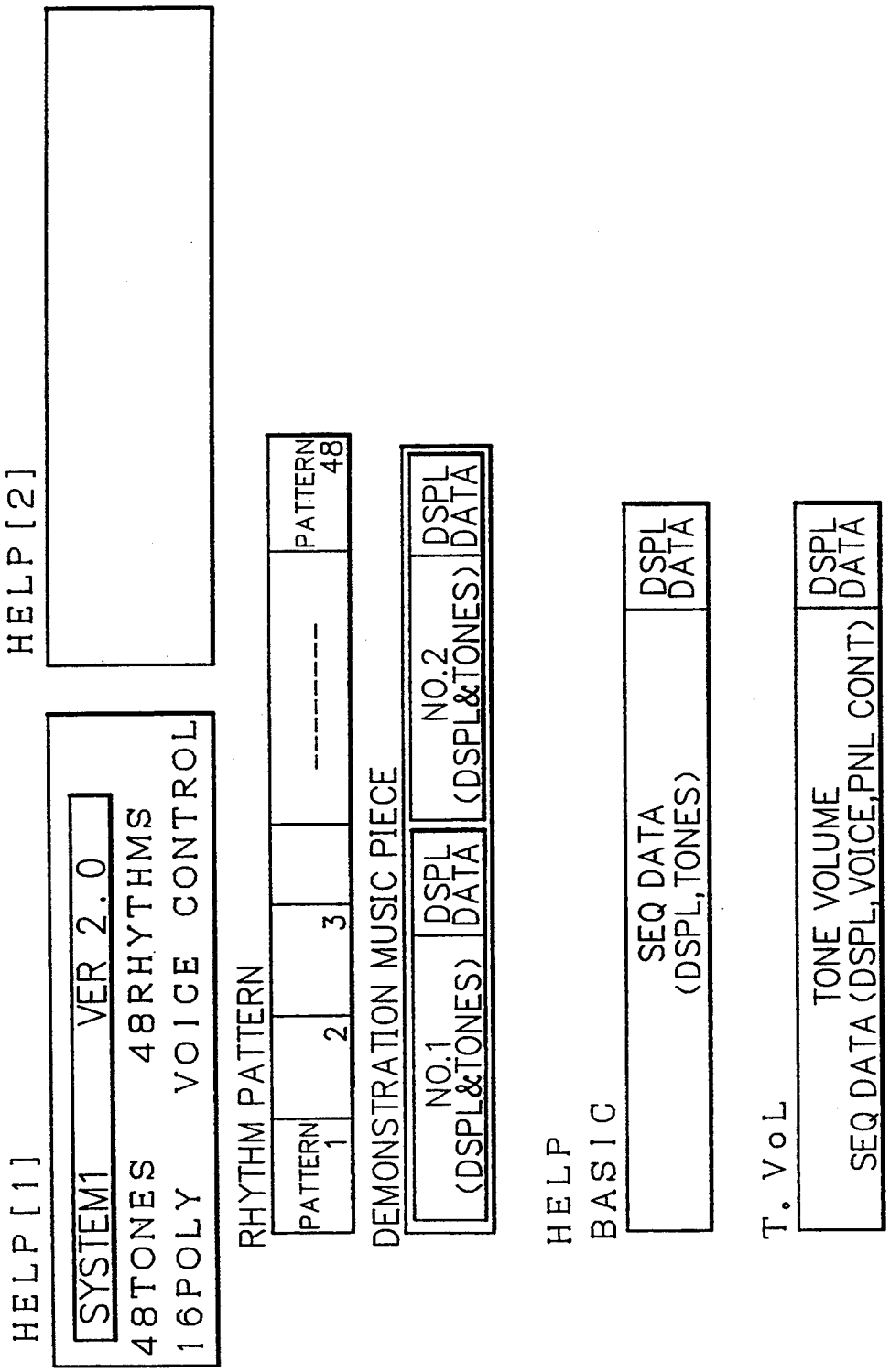
FIG. 12 is a view showing a content displayed on a display device and a data format.
Figure 13:
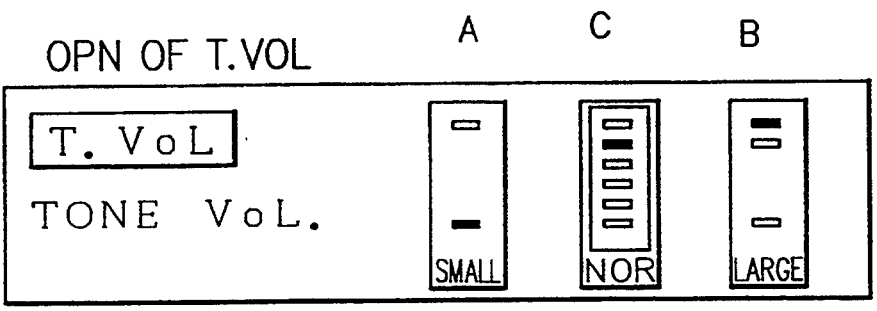
FIGS. 13(a) to 13(d) are views showing examples of contents displayed on the display device.
Figure 13:
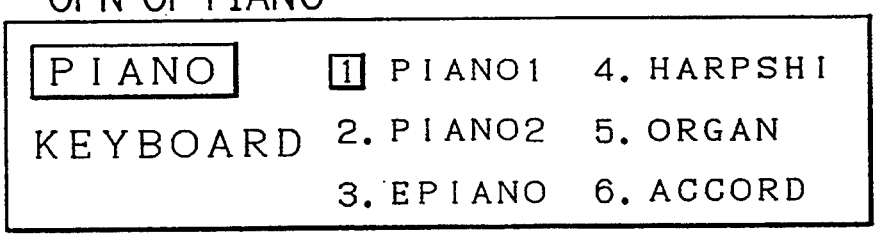
Figure 13:
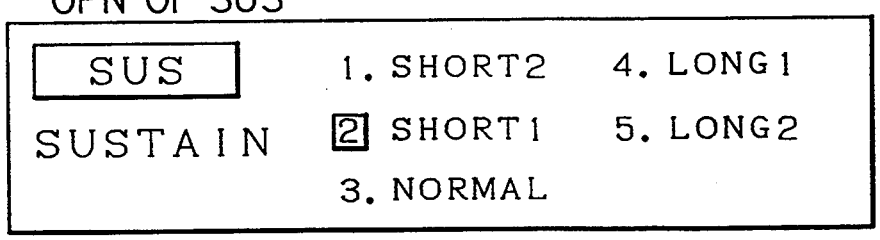
Figure 13:
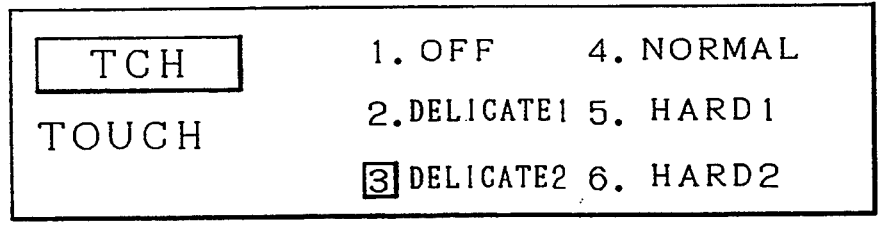

Note that the demonstration music piece data has a data format shown in FIG. 12. When this data is reproduced, the corresponding demonstration music piece is played, and a display for giving an explanation of, e.g., the specifications is made on the LCD 140. The demonstration music piece sequence includes a demonstration play tone code sequence and a display character code sequence, i.e., stores the tone code sequence including the character code sequence as a subroutine.

Data selected upon operation of the HELP switch has a format, as indicated by HELP BASIC, T.VOL in FIG. 12, and one sequence data includes character code information, play information, voice code information, and panel control information. Such sequence data may be stored in the ROM 2. Thus, in the BASIC mode upon selection of the HELP function, tone generation and a display for giving an explanation of the outline of the electronic musical instrument are performed. When the function of each operation switch is explained or the operation switch is operated, a voice output and display for explaining the function of the operation switch are performed, and the corresponding LED is turned on.

Figure 4:
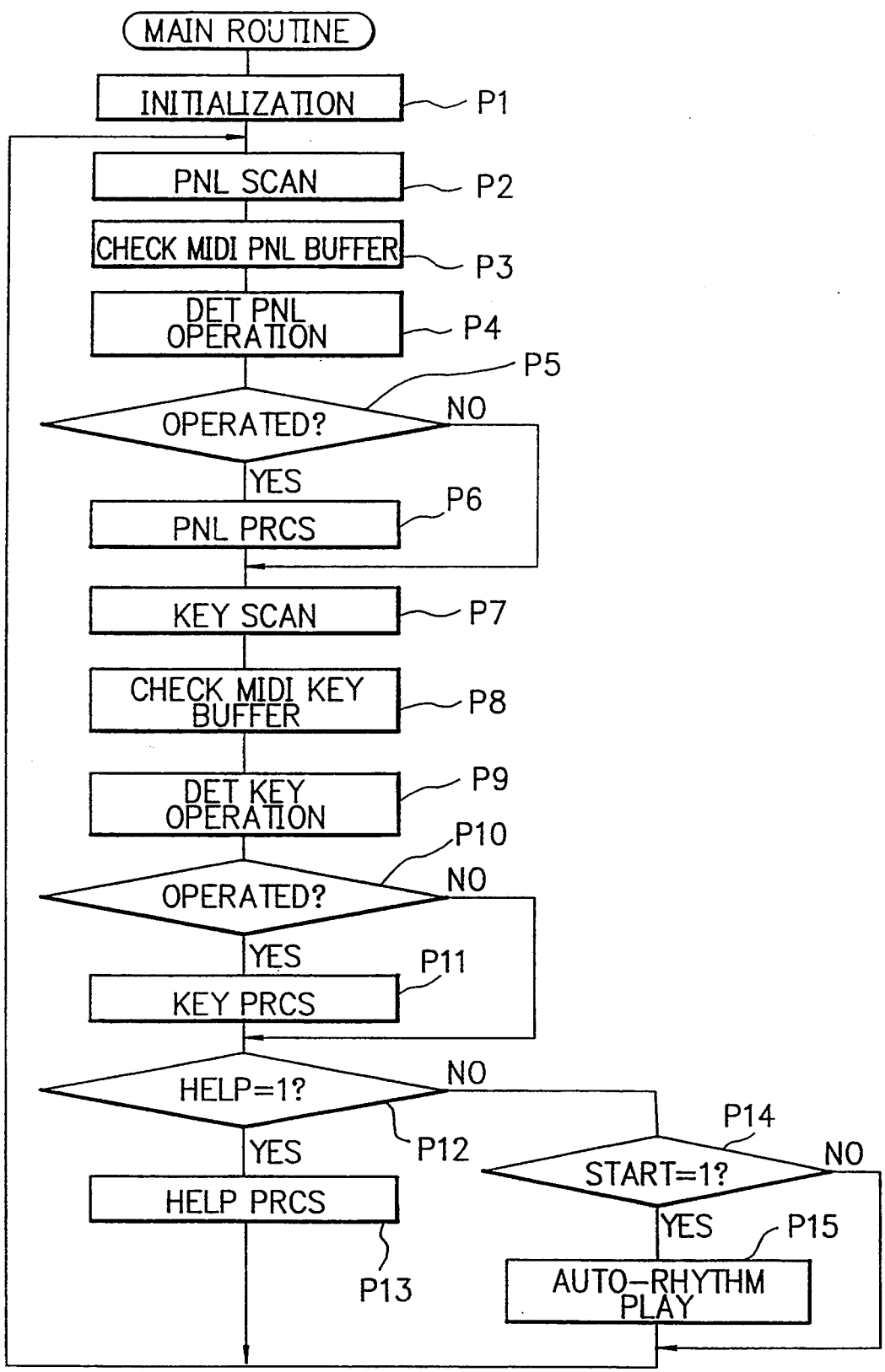
FIG. 4 is a flow chart showing main processing of the electronic musical instrument.

FIG. 4 shows the main processing of the explanation apparatus of the present invention. As can be seen from FIG. 4, when the power supply switch of the electronic musical instrument is turned on, the CPU 1 executes initialization processing in step P1, i.e., initializes a tone generator (tone source), clears the RAM 3, etc.

The flow then advances to step P2, and the CPU 1 executes panel scan processing (processing for sequentially checking the operation states of all the operation switches). In step P3, the CPU 1 checks the content of a MIDI panel buffer (not shown).

The CPU 1 detects a change in operation state of each operation switch in step P4, and discriminates in step P5 whether or not each operation switch is operated. If YES in step P5, the CPU 1 executes processing (panel processing) corresponding to the operated operation switch in step P6, and the flow then advances to step P7.

If NO in step P5, the flow jumps to step P7 without panel processing.

In step P7, the CPU 1 executes key scan processing to sequentially check the operation states of all the keys. Upon completion of the key scan processing, the CPU 1 checks the content of a MIDI key buffer (not shown) (step P8), and detects a change in operation state of each key (step P9). The flow then advances to step P10 to check if each key is operated.

If an operated key (subjected to an ON or OFF event) is detected in step P10, the CPU 1 executes processing corresponding to the operated key in step P11, and thereafter, the flow advances to step P12. If it is determined in step P10 that no key is operated, the flow jumps to step P12.

In step P12, the CPU 1 checks if the HELP mode is set upon operation of the HELP switch 102. If YES in step P12, the CPU 1 executes the above-mentioned HELP processing in step P13. Upon completion of the HELP processing, the flow returns to step P2 to execute panel scan processing, and the above-mentioned processing is repeated.

On the other hand, if it is determined in step P12 that the HELP mode is not set, the flow advances to step P14 to check if the start switch START 104 is operated. If YES in step P14, the CPU 1 executes an auto-rhythm play in step P15, and thereafter, the flow returns to step P2.

If NO In step P14, the flow returns to step P2 to repeat the above-mentioned operation.

Figure 5:
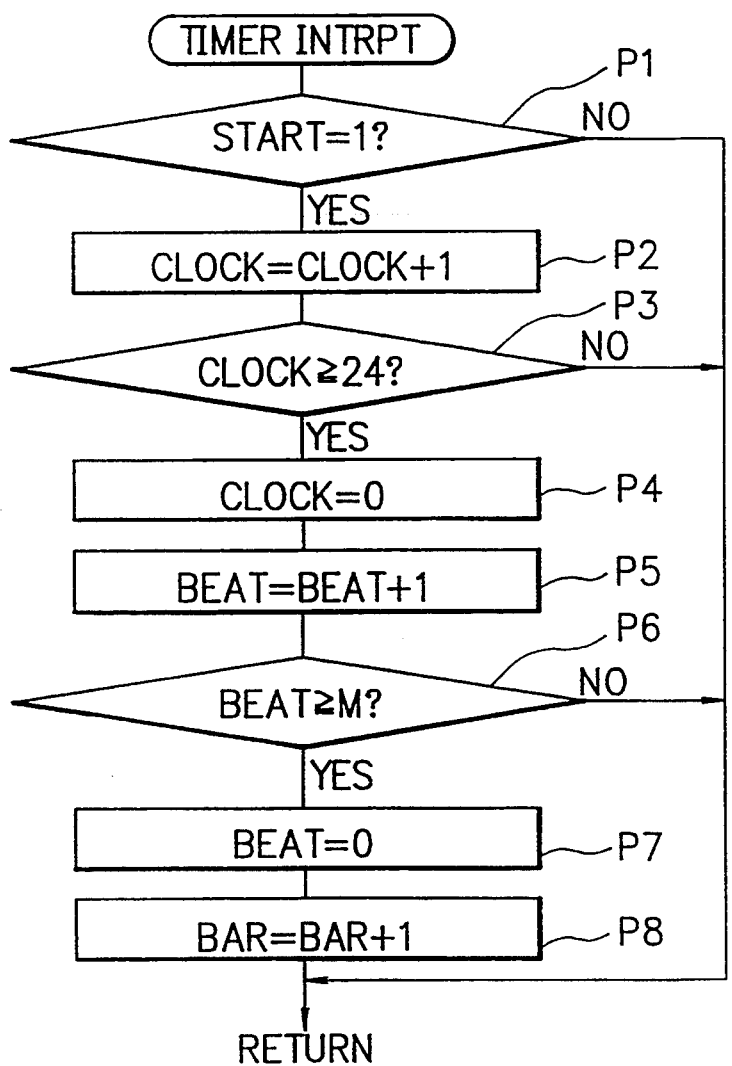
FIG. 5 is a flow chart showing timer interrupt processing.

Timer interrupt processing will be described below with reference to the flow chart shown in FIG. 5. The timer interrupt processing is executed in response to every clock pulse 96 times a quarternote, and a pulse is supplied to an interrupt input INT of the CPU 1 shown in the block diagram of FIG. 2. The frequency of the clock pulse is increased or decreased according to the selected tempo speed. For example, when "quarternote=120" is selected as the tempo speed, an interrupt occurs 11,520 (=120×96) times per minute.

When an interrupt occurs, it is checked in step P1 if the start switch START 104 is operated. If YES in step P1, the content of a clock counter CLOCK is incremented (counted up) by 1 in step P2, and it is checked in step P3 if the count value has reached 24.

If YES in step P3, the count value is cleared in step P4, and the content of a beat counter BEAT is incremented by 1 in step P5. It is then checked in step P6 if the content of the beat counter has reached a value M (the number of beats per bar) set in a beat max register. If YES in step P6, the beat counter is cleared in step P7, and the content of a bar counter BAR is incremented by 1 in step P8. If NO in step P3 or P6, the flow returns to the main routine.

Figure 6:
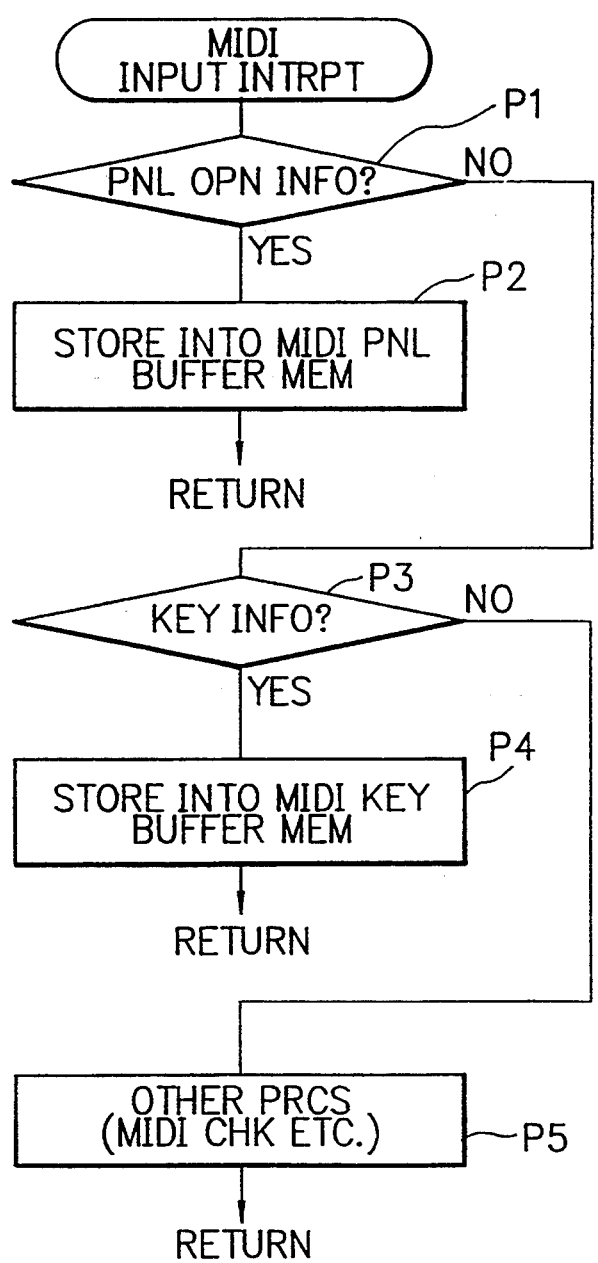
FIG. 6 is a flow chart showing MIDI input interrupt processing.

MIDI input interrupt processing will be described below with reference to the flow chart shown in FIG. 6.

In the MIDI input interrupt processing, it is checked in step P1 if input information is panel switch information. If YES in step P1, the input information is stored in the MIDI panel buffer in step P2.

If NO in step P1, it is checked in step P3 if the input information is key information. If YES in step P3, the input information is stored in the MIDI key buffer; otherwise, the flow advances to step P5 to execute other processing operations. Thereafter, the flow returns to the main routine.

Figure 7:
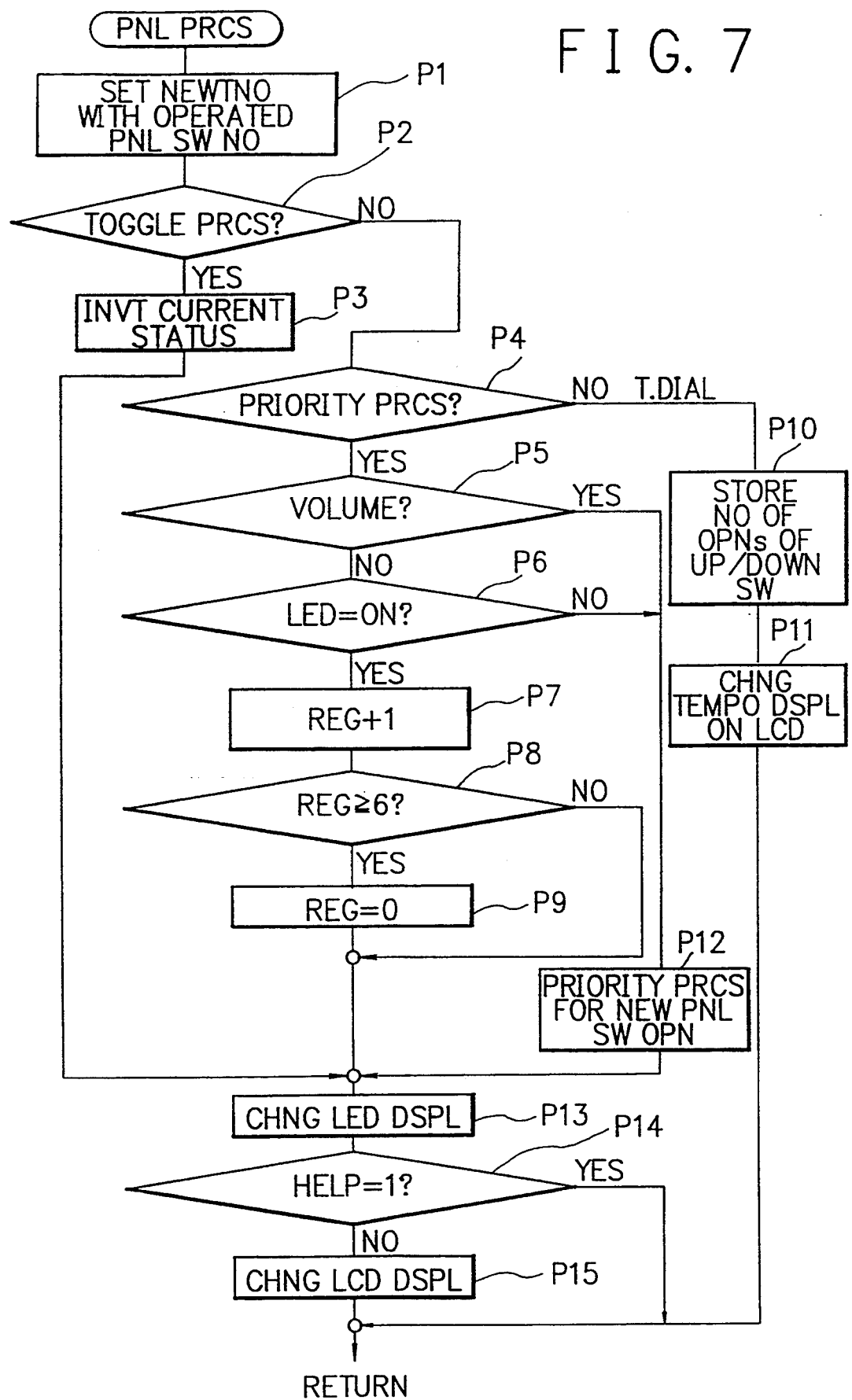
FIG. 7 is a flow chart showing a panel processing sequence.

FIG. 7 shows the panel processing. In this panel processing, the number of an operated panel switch is set as a new number NEWTNO in step P1. It is checked in step P2 if toggle processing is executed. If YES in step P2, the flow advances to step P3 to invert the current status of the panel switch. Thereafter, the flow advances to step P13.

If NO in step P2, the flow advances to step P4 to check if priority processing is executed. If YES in step P4, the flow advances to step P5 to check if the operated panel switch is one of the tone volume control switches 110.

If NO in step P5, the flow advances to step P6 to check if the LED of the operated panel switch is already turned on. If YES in step P6, the content of the corresponding register REG is incremented by 1.

The flow then advances to step P8 to check if the content of the corresponding register has reached 6. If NO in step P8, the flow jumps to step P13; otherwise, the content of the corresponding register is cleared to 0 in step P9, and the flow then advances to step P13.

If YES in step P5, and if NO in step P6, the flow advances to step P12 to execute the priority processing of the operation of a new panel switch. Thereafter, the flow advances to step P13.

In step P13, an LED display is changed. The flow advances to step P14 to check if the HELP mode is set. If NO in step P14, an LCD display content is changed according to the operation state of the panel switch; otherwise, the flow returns to the main routine.

If NO in step P4, since it is determined that the operated panel switch is the dial 105, the number of times of operations of the up/down switches is stored in step P10, and a tempo display on the LCD is changed in step P11. Thereafter, the flow returns to the main routine.

Figure 8:
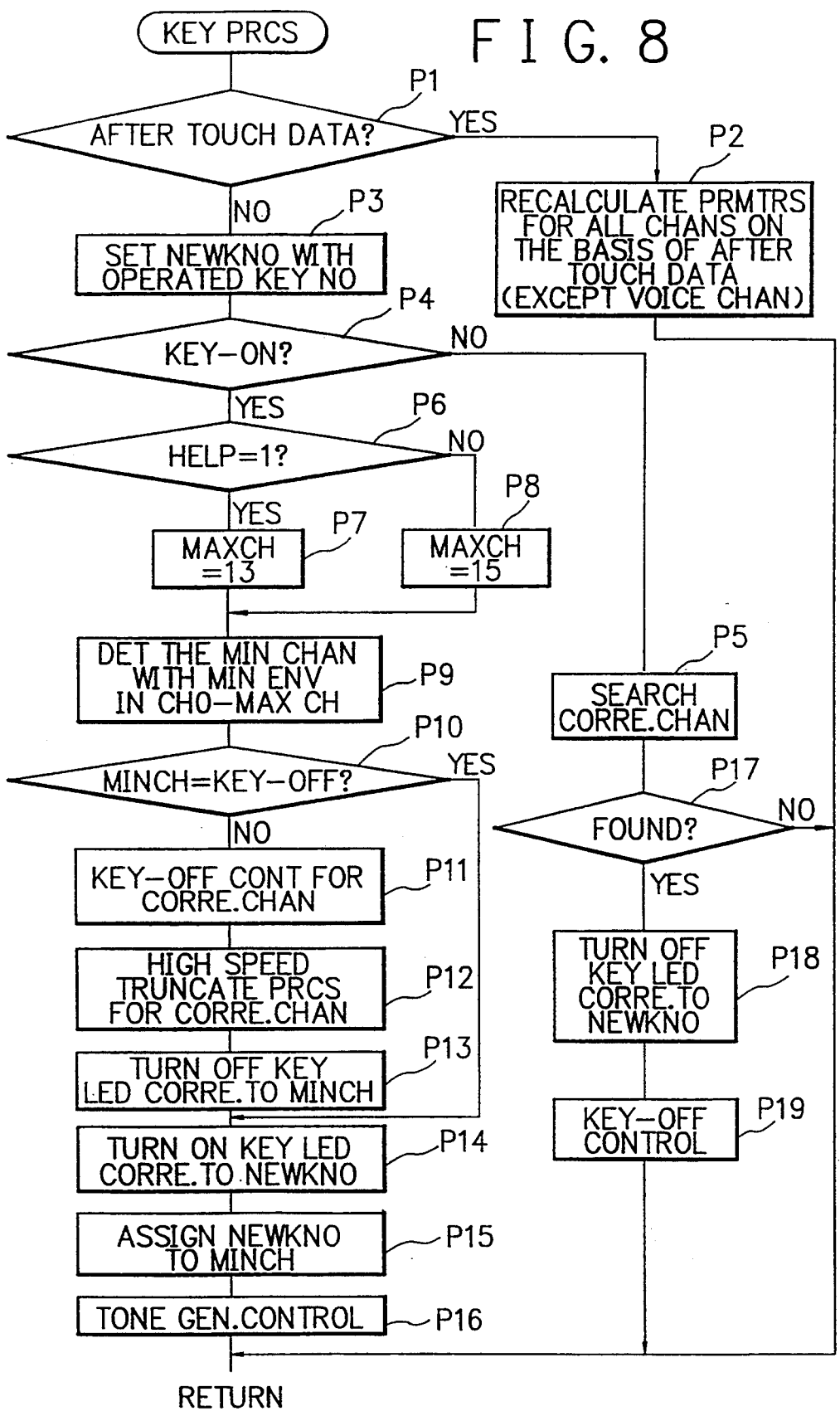
FIG. 8 is a flow chart for explaining a key processing operation.

A key processing operation will be described below with reference to the flow chart shown in FIG. 8. In this key processing, it is checked in step P1 if input data is after touch data. If YES in step P1, the flow advances to step P2, and parameters of all the channels except for voice channels are re-calculated on the basis of the after touch data.

If NO in step P1, the flow advances to step P3, and the number of an operated key is set as a new key number NEWKNO. The flow then advances to step P4 to check if a key ON event is detected. If NO in step P4, i.e., if a key OFF event is detected, the flow advances to step P5 to search the corresponding channel; otherwise, the flow advances to step P6 to check if HELP=1.

If YES in step P6, the flow advances to step P7 to set MAXCH=13 (to set the number of tone channels to be 13). Thereafter, the flow advances to step P9. If NO in step P6, the flow advances to step P8 to set MAXCH=15, and thereafter, the flow advances to step P9. In step P9, a channel MINCH with a minimum envelope is detected from a channel CH0 to the channel MAXCH.

It is checked in step P10 if MINCH=key OFF. If YES in step P10, the flow jumps to step P14. However, if NO in step P10, key OFF control of the corresponding channel is performed in step P11, and high-speed truncation processing of the corresponding channel is performed in step P12. Furthermore, in step P13, the LED corresponding to the key assigned to the channel MINCH is turned off. Thereafter, the flow advances to step P14.

In step P14, the LED corresponding to the key of the new key number NEWKNO is turned on. The flow advances to step P15, and the new key number NEWKNO is assigned to the channel MINCH. In step P16, tone generation control is performed to generate a corresponding tone.

After the corresponding channel is searched in step P5, the flow advances to step P17 to check if the corresponding channel is found. If YES in step P17, the flow advances to step P18 to turn off the LED corresponding to the new key number NEWKNO. The flow then advances to step P19 to execute key OFF control.

FIG. 9 is a flow chart showing the details of the HELP processing operation. The flow starting from node (A) indicates ON-event processing of the HELP switch 102 (processing executed upon operation of only the HELP switch after the power supply switch is turned on), and the flow starting from node (B) indicates ON-event processing of a switch other than the HELP switch (processing executed when another panel switch is operated after the HELP switch is depressed).

In the ON-event processing of the HELP switch starting from node (A), it is checked in step P1 if the HELP switch is turned on. If NO in step P1, the flow returns to the main routine; otherwise, the flow advances to step P2.

It is checked in step P2 if HELP ff=1. If YES in step P2, channels CH14 and CH15 are cleared in step P3. The flow then advances to step P4 to re-assign these cleared channels to tone channels.

If NO in step P2, the flow advances to step P5 to clear the channels CH14 and CH15. In step P6, processing for setting STAGE=0 is executed, and the flow then advances to step P11.

In the ON-event processing of the switch other than the HELP switch starting from node (B), it is checked in step P7 if a switch other than the HELP switch is turned on. If NO in step P7, the flow returns to the main routine; otherwise, the flow advances to step P8.

It is checked in step P8 if HELP ff=1. If NO in step P8, the flow returns to the main routine; otherwise, it is checked in step P9 if the currently operated panel switch is the same as the previously operated panel switch (NewTBNO=OldTBNO). If YES in step P9, the flow jumps to step P13; otherwise, processing for setting STAGE=NewTBNO is executed in step P10, and the flow advances to step P11.

In step P11, processing for setting POINTER=0 is executed. In step P12, the play operation of a demonstration music piece corresponding to the content of a stage register STAGE is started.

In step P13, the voice code sequence of the corresponding stage is read out, and in step P14, the readout voice code sequence is assigned to the voice channels CH14 and CH15. Thus, a specification explanation with a voice can be given. At the same time, a display content on the LCD is changed in correspondence with the content of the explanation. In step P15, it is checked if the end of sequence is reached. If YES in step P15, the content of the stage register is incremented by 1 in step P16, and it is then checked in step P17 if the content of the stage register has reached 35 (see FIG. 7).

If NO in step P17, the flow returns to step P11; otherwise, the flow advances to step P18 to set HELP=0. Thereafter, the corresponding LED is turned off in step P19, and the LCD is set in the normal display mode in step P20.

Figure 11:
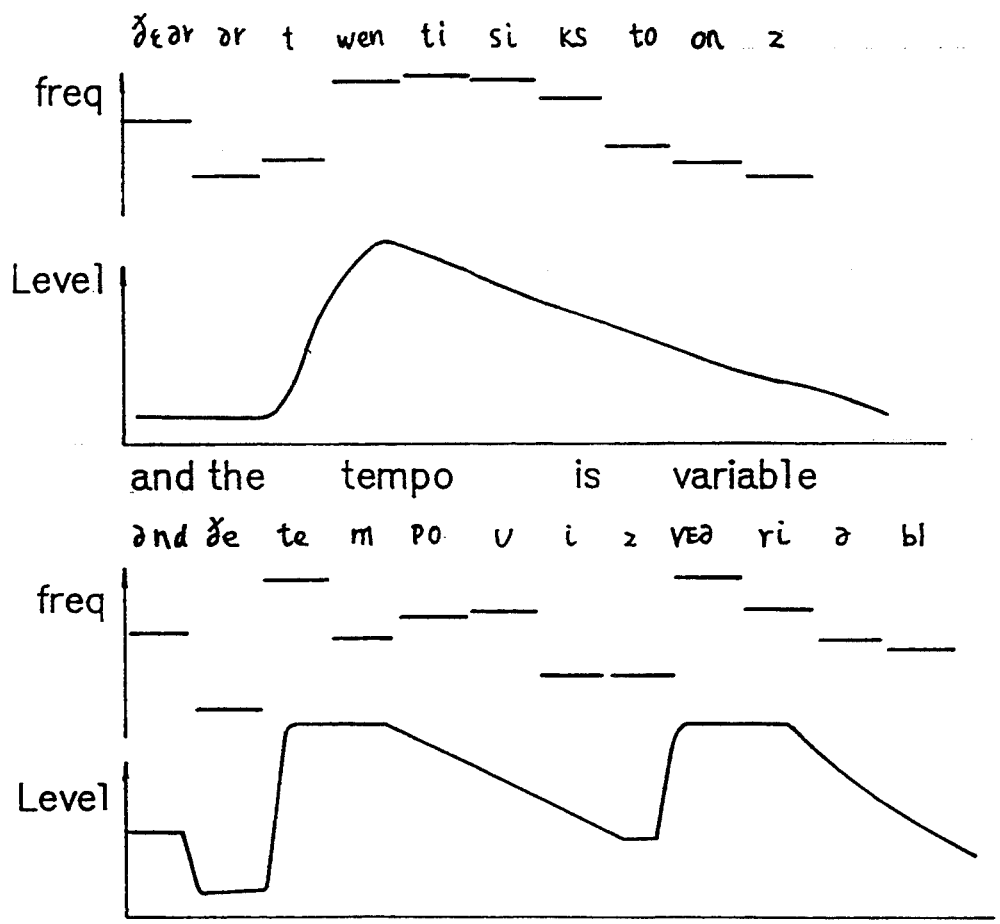
FIG. 11 is a graph showing the relationship between the voice generation frequency and the tone volume level of English words.

FIGS. 10(a) to 10(c) and FIG. 11 are graphs showing the relationship between the tone generation frequency and the tone volume level. FIGS. 10(a) to 10(c) show voice generation examples of Japanese words, and FIG. 11 shows voice generation examples of English words. FIGS. 13(a) to 14(d) show display examples on the LCD upon operations of the panel switches.

Figure 16:
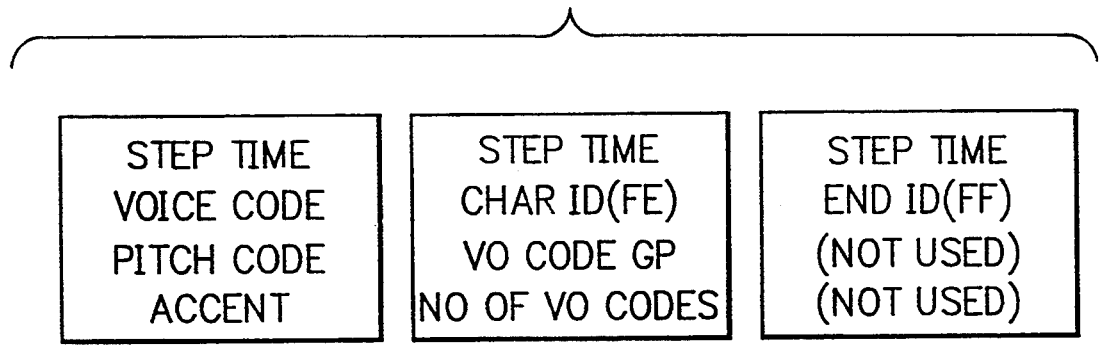
FIG. 16 is a view showing the data architecture of voice code sequence data.

FIG. 15 shows the correspondence between the tone color number and the tone color name, and FIG. 16 shows the data architecture of the voice code sequence data. The voice code data are constituted in units of 4 bytes. The first byte stores relative time information from the previous data as step time data, and the second byte stores a voice code (in this case, neither FE nor FF are used so as to distinguish the voice code from character identification information "FE$_{HEX}$" and end identification information "FF$_{HEX}$").

The third byte stores a pitch code or a character code group (a character string to be displayed on only the entire screen of the LCD), and the fourth byte stores an accent or the number of character codes. Since a plurality of character code groups are often included in a single voice code sequence, they are managed by numbers. The number of character codes indicates the number of character codes (the number of bytes) included in a designated character code group, and is limited to an integer multiple of 4. The remaining bytes store non-display codes.

FIG. 17 shows the relationship among the operation switch number TBNO, the operation switch name, the corresponding register value, and the display flag.

Figure 18:
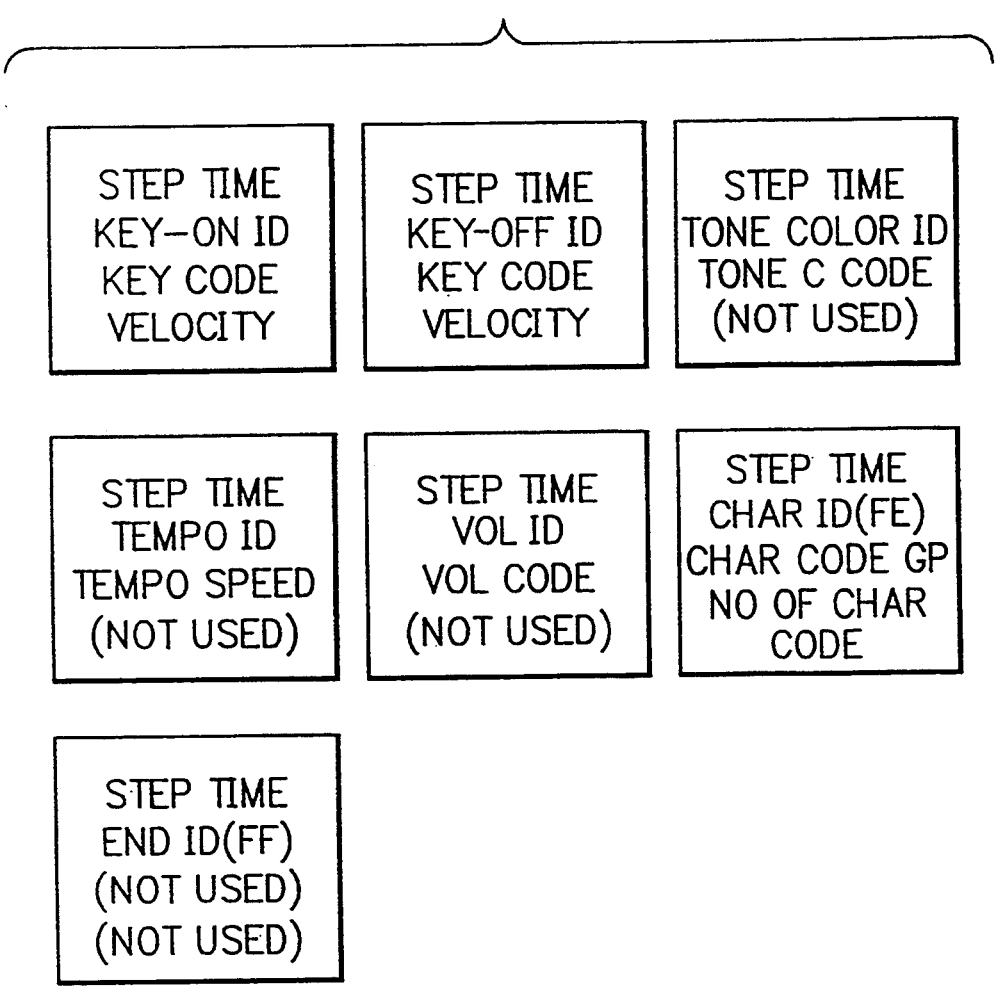
FIG. 18 is a view showing the data architecture of tone code sequence data.

FIG. 18 is a view showing the data architecture of the tone code sequence. In this code sequence, all the data are constituted in units of 4 bytes. The first byte stores a step time as in the voice code sequence, the second byte stores information for identifying various commands, the third byte stores data to be supplied, and the fourth byte stores data if necessary.

Figure 19:
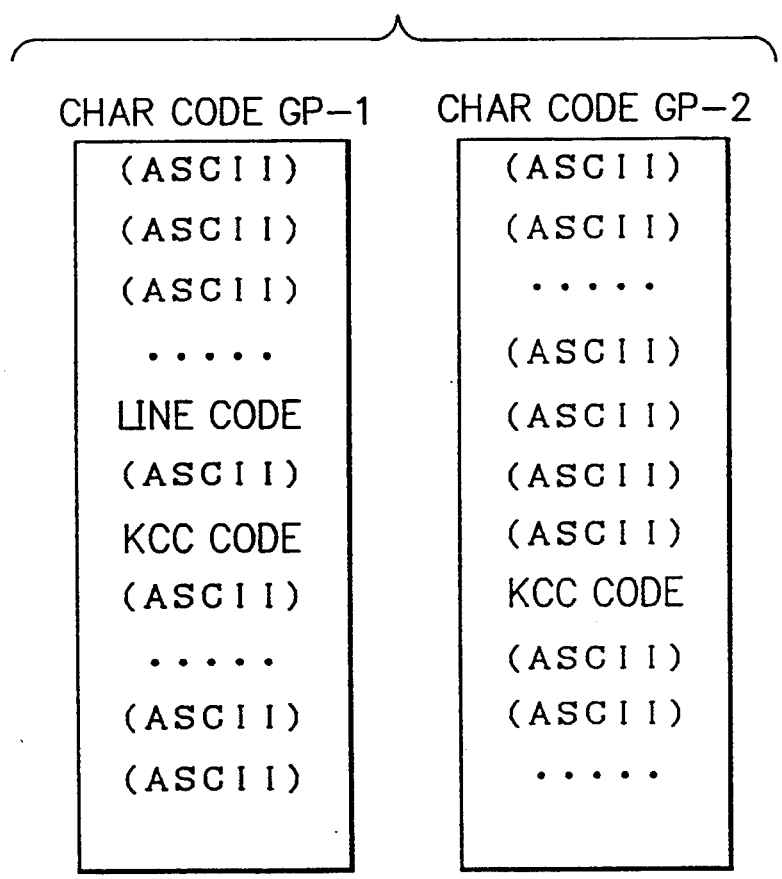
FIG. 19 is a view showing the data architecture of display character code sequence data.

FIG. 19 is a view showing the data architecture of the display character code sequence. The character code sequence mainly consists of a series of character codes (ASCII codes), and also includes kanji character conversion codes KCC for converting a plurality of ASCII codes into kanji characters, and line codes for writing vertical or horizontal lines.

As described above, a user can learn the specifications of an electronic musical instrument without reading a thick text book such as a user's manual. Since the apparatus of the present invention is excellent for identifying and explaining a necessary section of a user, the user can immediately aurally learn a section that he or she wants to learn, and the time required for learning, e.g., the specifications of the electronic musical instrument by the user can be shortened. Since explanations of the specifications are given by utilizing the tone generation means, the user can aurally understand the specifications and states of the electronic musical instrument, thus facilitating understanding. Therefore, for example, a sales person need not bring a text book such as a user's manual in a sales promotion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An explanation apparatus for an electronic musical instrument, comprising:
   first display means capable of displaying a plurality of types of information;
   character code information storage means for storing a plurality of pieces of character code information associated with explanations of specifications and states of said electronic musical instrument;
   tone generation means capable of generating a plurality of tones;
   play information storage means for storing play information such as a demonstration music piece;
   operation means for enabling a specification/state explanation function;
   second display means for reading out the plurality of pieces character code information from said character code information storage means in response to an operation of said operation means, and causing said display device to perform a corresponding display; and
   tone control means for reading the play information from said play information storage means in response to an operation of said operation means, and operating said tone generation means to generate tones.

2. The apparatus of claim 1, wherein said play information storage means stores information associated with a read timing of the plurality of pieces of character code information from said character code information storage means.

3. The apparatus of claim 1, wherein said character code information storage means stores information associated with a read timing of the play information from said play information storage means.

4. The apparatus of claim 1, wherein both the play information and the character code information are stored in a single read sequence.

5. An explanation apparatus for an electronic musical instrument, comprising:
   tone generation means including a channel capable of generating a tone and a voice;
   tone color designation means for designating a tone color of the tone;

tone color data storage means for storing tone color data associated with the tone color;

key information designation means for designating key information to be subjected to tone generation;

tone control means for assigning the designated key information to said channel and causing said tone generation means to generate the tone on the basis of the tone color data of the designated tone color;

operation means for enabling a specification/state explanation function;

voice code storage means for storing voice code information associated with the specification/state explanation;

voice data storage means for storing voice data corresponding to the voice code information; and voice control means for reading the voice data on the basis of the voice code information read from said voice code storage means in response to an operation of said operation means, assigning the read voice data to the channel, and causing said tone generation means to generate the voice.

6. The apparatus of claim 5, wherein said tone color data storage means and said voice data storage means are included in one storage device.

7. The apparatus of claim 5, wherein a storage method of said tone color data storage means is different from a storage method of said voice data storage means, and the voice data is stored by an ADPCM method.

8. An explanation apparatus of an electronic musical instrument, comprising:

display means capable of displaying a plurality of different types of information;

voice generation means for generating a voice;

code storage means for storing character code information and voice code information associated with explanations of specifications and states of said electronic musical instrument;

voice data storage means for storing voice data corresponding to the voice code information; and control means for selecting a set of character code information and voice code information from said code storage means in response to an operation of an operation switch, causing said display means to display characters corresponding to the selected character code information, reading voice data corresponding to the selected voice code information, and causing siad voice generation means to generate a corresponding voice.

9. The apparatus of claim 8, wherein said operation switch is a switch or a mouse.

10. An explanation apparatus for an electronic musical instrument, comprising:

display means capable of displaying a plurality of different types of information;

voice generation means for generating a voice;

code storage means for storing character code information and voice code information associated with explanations of specifications and states of said electronic musical instrument;

voice data storage means for storing voice data corresponding to the voice code information;

input means for inputting operation information of an operation switch by a voice; and control means for selecting a set of character code information and voice code information from said code storage means in response to the input operation information, causing said display means to display characters corresponding to the selected character code information, reading voice data corresponding to the selected voice code information, and causing said voice generation means to generate a corresponding voice.

* * * * *

UNITED STATES PATENT AND TRADEMARK OFFICE
CERTIFICATE OF CORRECTION

PATENT NO. : 5,399,800  
DATED : March 21, 1995  
INVENTOR(S) : Morita, et al

Page 1 of 2

It is certified that error appears in the above-indentified patent and that said Letters Patent is hereby corrected as shown below:

Column 16, line 26, claim 1 should read

An explanation apparatus for an electronic musical instrument, comprising:

[first] display means capable of displaying a plurality of types of information;

character code information storage means for storing a plurality of pieces of character code information associated with explanations of specifications and states of said electronic musical instrument;

tone generation means capable of generating a plurality of tones;

play information storage means for storing play information such as a demonstration music piece;

operation means for enabling a specification/state explanation function;

UNITED STATES PATENT AND TRADEMARK OFFICE
CERTIFICATE OF CORRECTION

PATENT NO. : 5,399,800
DATED : March 21, 1995
INVENTOR(S) : Morita, et al

It is certified that error appears in the above-indentified patent and that said Letters Patent is hereby corrected as shown below:

[second display] means for reading out the plurality of pieces character code information from said character code information storage means in response to an operation of said operation means, and causing said display [device] <u>means</u> to perform a corresponding display; and tone control means for reading the play information from said play information storage means in response to an operation of said operation means, and operating said tone generation means to generate tones.

Signed and Sealed this

Twenty-third Day of June, 1998

Attest:

BRUCE LEHMAN

*Attesting Officer*        *Commissioner of Patents and Trademarks*